(12) United States Patent
Dotan et al.

(10) Patent No.: US 8,850,537 B1
(45) Date of Patent: Sep. 30, 2014

(54) SELF-TUNING KNOWLEDGE-BASED AUTHENTICATION

(71) Applicant: EMC Corporation, Hopkinton, MA (US)

(72) Inventors: Yedidya Dotan, Newton, MA (US); Yael Villa, Tel Aviv (IL); Boris Kronrod, Netania (IL)

(73) Assignee: EMC Corporation, Hopkinton, MA (US)

( * ) Notice: Subject to any disclaimer, the term of this patent is extended or adjusted under 35 U.S.C. 154(b) by 92 days.

(21) Appl. No.: 13/628,624

(22) Filed: Sep. 27, 2012

(51) Int. Cl.
*H04L 29/06* (2006.01)

(52) U.S. Cl.
USPC ............................................................. 726/6

(58) Field of Classification Search
CPC ......... G06F 21/45; G06F 21/46; G06F 21/30; H04L 63/08
USPC ......................................... 726/5, 6, 7, 18, 19
See application file for complete search history.

(56) References Cited

U.S. PATENT DOCUMENTS 8,412,938 B2     4/2013   Farrugia et al.
2009/0305670 A1*   12/2009   DeBoer et al. ................ 455/411

* cited by examiner

*Primary Examiner* — Edward Zee
(74) *Attorney, Agent, or Firm* — BainwoodHuang

(57) ABSTRACT

An improved technique involves automatically producing a set of KBA questions using values of attributes associated with correctly answered questions. A KBA question server obtains such attribute values from a prior set of pilot questions taken from users who were successfully authenticated. Examples of attributes include a source of facts in a question, placement of facts in a question, and question structure. The KBA question server then generates optimal formatting rules based on the attribute values; such formatting rules define a relationship between facts used to derive KBA questions and the words used to express the KBA questions to users. The KBA question generator then produces KBA questions according to the formatting rules.

21 Claims, 6 Drawing Sheets

80

| Question | Fact Source | Word Placement | Q Structure | Score |
|---|---|---|---|---|
| With whom did you attend the meeting? | calendar | end | active | 0.67 |
| User A, User B, and User C | | | | |
| User A, User B, and User D | | | | |
| User B, User C, and User D | | | | |
| User C and User D | | | | |

SELF-TUNING KNOWLEDGE-BASED AUTHENTICATION

BACKGROUND

Knowledge-based authentication (KBA) involves deriving questions regarding a particular user from facts in a database, and then asking that user one or more of the derived questions to verify the authenticity of the user. For example, KBA accesses facts such as addresses, mortgage payments, and driving records from a LexisNexis® server, a credit bureau or a motor vehicle registry.

Some conventional KBA systems use pilot questions to determine the quality of the questions being provided to users. Such pilot questions appear to the users as normal KBA questions. Rather than use the pilot questions to authenticate users, however, such systems use the pilot questions to evaluate whether the pilot questions are effective for authentication. As such, the pilot questions represent a feedback mechanism for the KBA systems in generating new KBA questions.

The conventional KBA systems that employ pilot questions use a manual inspection of pilot question results for guidance on building new KBA questions. In a typical case, an administrator evaluates pilot question results and bases new KBA questions on the pilot questions that were answered correctly most often by those users successfully authenticated. Such an administrator's experience and knowledge of KBA policies play a role in determining the form of the new KBA questions.

SUMMARY

Unfortunately, there are deficiencies with the above-described conventional KBA systems that use pilot questions. For example, manual evaluation of pilot questions may require exposing an administrator to sensitive information. Such a requirement may be a disadvantage for corporations for which providing such results to a third party administrator may represent an unacceptable exposure of the sensitive information. Rather, they would entrust an internal administrator to construct KBA questions from the results manually. Nevertheless, such a scheme is not practical because many corporations do not have the resources to manually evaluate results of pilot questions internally. Further, manual evaluation of pilot questions runs a high risk of errors, as such evaluation relies on human judgment.

In contrast to conventional KBA systems that use pilot questions in which required manual analysis by a third-party administrator runs a risk of exposing the administrator to sensitive information, an improved technique involves automating the analysis of pilot question results by determining formats of the KBA questions that successfully authenticated users were able to answer correctly most often. The improved technique then involves generating new KBA questions using those formats. In some arrangements, the automated analysis determines format types by classifying communication factors that make up a format. Such communication factors include a font in which a written question is displayed, fact source from which a KBA question was derived, use of passive or active voice, and placement of a fact within a question. Along these lines, the automated analysis then determines the combinations of communication factors that produce the KBA question formats that minimize the risk of false negatives in KBA.

For example, suppose that a KBA question server categorizes a pool of KBA questions using values of expressive factors such as a fact source from which a KBA question was derived, a placement of a fact within the KBA question, and whether the KBA question is in active or passive voice. Along these lines, a KBA question such as "Who is your manager?" may have communication factor values of "email server," "question end," and "active voice," respectively. Other KBA questions may have different values of these communication factors. In such cases, the KBA question server would use statistical techniques to determine the optimal values of the communication factor based on a fraction of legitimate users that answered each pilot question correctly. Specifically, the KBA question would consider values of the communication factor as optimal when the fraction is greater than a threshold value. The KBA question server would then construct a set of formatting rules based on the optimal values of the communication factors; from these formatting rules, the KBA question server would generate new KBA questions for authenticating users. The KBA question server, on the other hand, would not use formats corresponding to questions that a sufficient fraction of legitimate users answered incorrectly.

Advantageously, the improved technique allows a corporation to avoid exposing sensitive information because the corporation is able to handle feedback data internally. Because the KBA question server is configured to analyze results of pilot questions based on a set of communication factors, such analysis may be automated and would not require a third party to provide expertise. In this way, the corporation is better able to have confidence in authentication results because they are able to tune KBA questions automatically based on criteria designed to help legitimate users authenticate dependably. Further, the improved technique allows for a more consistent treatment of the answers to pilot questions that is free from human error. Still further, the improved technique allows for better localization; for example, some dialects prefer passive to active voice.

One embodiment of the improved technique is directed to a method of generating KBA questions from a set of facts. The method includes receiving answers to a prior set of KBA questions from a group of users, each user of the group of users having been successfully authenticated using questions from another prior set of KBA questions distinct from the prior set of KBA questions, each KBA question of the prior set of KBA questions having a format selected from a set of predefined formats, each format of the set of predefined formats defining a relationship between facts of the set of facts and words of a set of words in which the prior set of KBA questions are expressed. The method also includes identifying a correct subset of the prior set of KBA questions to which the group of users provided correct answers and an incorrect subset of the prior set of KBA questions to which the group of users provided incorrect answers. The method further includes automatically selecting a first subset of the predefined set of formats based on the correct subset and a second subset of the predefined set of formats based on the incorrect subset. The method further includes generating a new set of KBA questions from facts of the set of facts, each KBA question of the new set of KBA questions having a format of the first subset of the predefined set of formats to improve effectiveness of future KBA questions.

Additionally, some embodiments of the improved technique are directed to a system constructed and arranged to generate KBA questions from a set of facts. The system includes memory, and a controller including controlling circuitry constructed and arranged to carry out the method of generating KBA questions from a set of facts.

Furthermore, some embodiments of the improved technique are directed to a computer program product having a non-transitory computer readable storage medium which stores code including a set of instructions to carry the method of generating KBA questions from a set of facts.

BRIEF DESCRIPTION OF THE DRAWING

The foregoing and other objects, features and advantages will be apparent from the following description of particular embodiments of the invention, as illustrated in the accompanying figures in which like reference characters refer to the same parts throughout the different views.

DETAILED DESCRIPTION

An improved technique involves automating the analysis of pilot question results. Such an automated analysis of pilot question results in turn involves correlating a format in which a KBA question may be expressed to the ability of authentic users to answer that question. That is, the automated analysis would determine the types of formats that authenticated users answer correctly most often. In some arrangements, the automated analysis determines format types by classifying communication factors that make up a format; such expressive factors include a font in which a written question is displayed, fact source from which a KBA question was derived, use of passive or active voice, and placement of a fact within a question. Along these lines, the automated analysis then determines the combinations of communication factors that produce the KBA question formats that minimize the risk of false negatives in KBA.

Advantageously, the improved technique allows a corporation to avoid exposing sensitive information because the corporation is able to handle feedback data internally. Because the KBA question server is configured to analyze results of pilot questions based on a set of communication factors, such analysis may be automated and would not require a third party to provide expertise. In this way, the corporation is better able to have confidence in authentication results because they are able to tune KBA questions automatically based on criteria designed to help legitimate users authenticate dependably. Further, the improved technique allows for a more consistent treatment of the answers to pilot questions that is free from human error.

Figure 1:
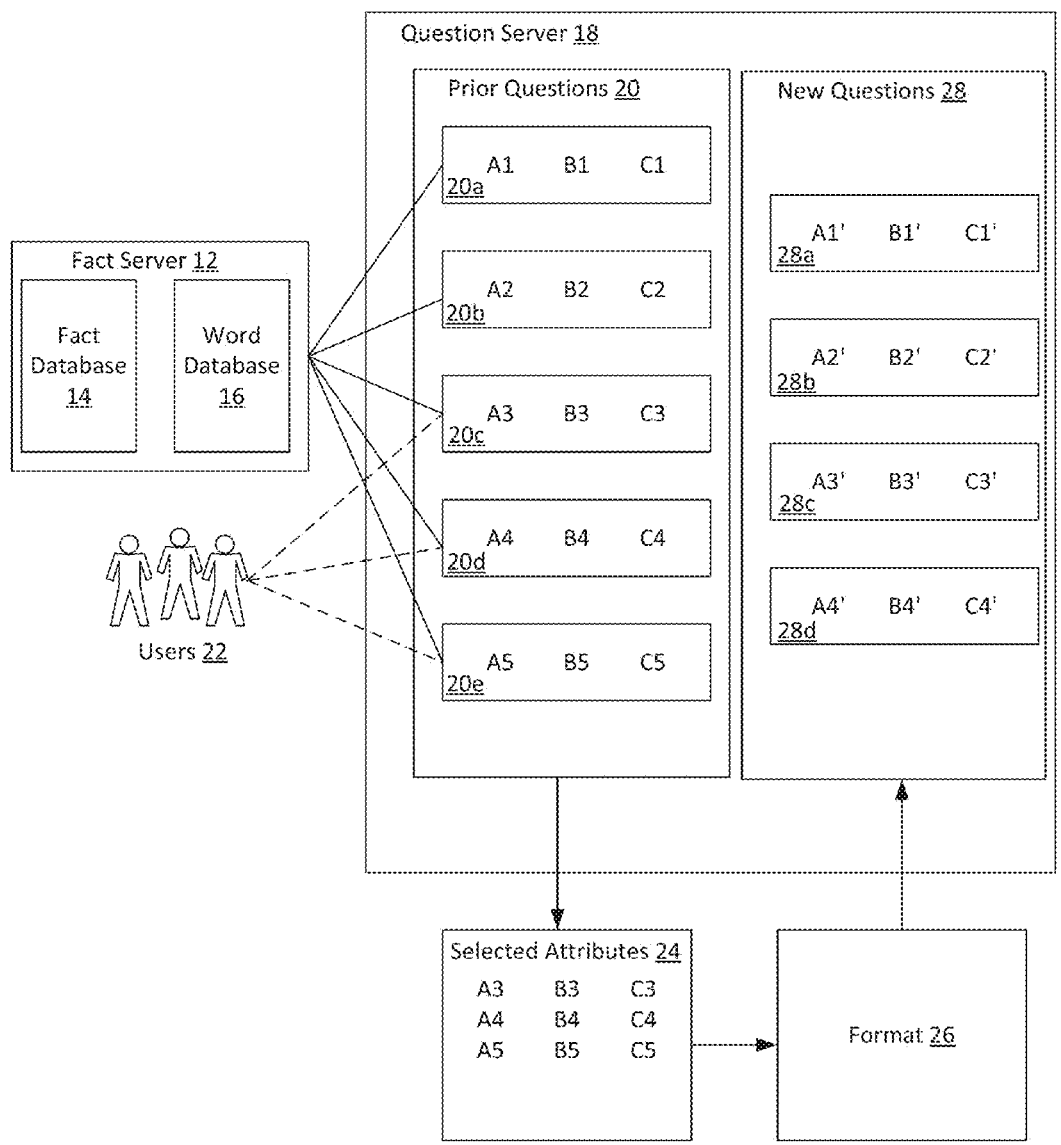
FIG. 1 is a block diagram illustrating an example electronic environment for carrying out the improved technique.

FIG. 1 illustrates an example electronic environment 10 for carrying out the improved technique. Electronic environment 10 includes fact server 12 and question server 18.

Fact server 12 is constructed and arranged to store facts and words used in the generation of KBA questions. Fact server 12 includes fact database 14 and word database 16.

Fact database 14 is constructed and arranged to store facts obtained from various facts sources (e.g., Microsoft® Exchange, SAP® server). Examples of facts include membership in a department in a corporation, attendance at a meeting, invitation to a series of meetings, and customer data.

Word database 16 is constructed and arranged to store words used to produce KBA questions from facts.

Question server 18 is constructed and arranged to produce KBA questions from facts in fact database 14 and words in word database 16. Question server 18 is also constructed and arranged to store KBA questions so produced. In the example presented in FIG. 1, question server 18 includes a set of prior questions 20 and a set of new questions 28.

Prior questions 20 include pilot questions 20a, 20b, 20c, 20d, and 20e to which answers were provided by users 22. Each of the prior questions 20 includes values of attributes A, B, and C. Examples of prior questions 20 include "Which of the following people attended the meeting last Wednesday at 2:00 PM?", "How many managerial layers are there between you and the CEO?", and "Where is User X?". Examples of attributes of prior questions 20 include the source of facts used in generating a question, structure of a question (e.g., passive or active voice), placement of facts within a question (e.g., beginning or end), and presentation of a question (e.g., font for text presentation, audio presentation, etc.).

In some arrangements, pilot questions 20a, 20b, 20c, 20d, and 20e each represent different expressions of the same query. For example, asking a user who their manager is may take the following forms: "Who is your boss?", "Your evaluation was performed by whom?", and "Who runs your group meetings?". Question server 18 generates such pilot questions from the same set of facts, and they have the same correct answer.

It should be understood that pilot questions 20a, 20b, 20c, 20d, and 20e would not be used in the decision to authenticate users 22. Rather, other questions that were not pilot questions 20a, 20b, 20c, 20d, and 20e would be used. Nevertheless, users 22 would not suspect any difference between pilot questions 20a, 20b, 20c, 20d, and 20e and the other questions.

New questions 28 are configured to be presented to users 22 for authentication. New questions 28 also include values of attributes A, B, and C, and are generated according to a procedure such as that described below.

During operation, question server 18 receives answers to prior questions 20 from users 22. In the scenario illustrated FIG. 1, correct answers had been provided to questions 20c, 20d, and 20e. In some arrangements, a sufficient fraction of answers to questions 20c, 20d, and 20e provided by users 22 had been correct.

For questions 20c, 20d, and 20e, to which correct answers were provided by users 22, question server 18 identifies values of attributes A, B, C (A3, B3, C3 for question 20c; A4, B4, C4 for question 20d; and A5, B5, and C5 for question 20e). For example, attribute A represents the source of the fact from which a question was derived, attribute B represents a structure of the question, and attribute C represents a placement of a fact within the question. Examples of values of attributes for prior questions 20 will be described below with respect to FIGS. 3 and 4. From the correct questions 20c, 20d, and 20e, question server 18 forms a set of selected attribute values 24 that includes the values of the attributes of the correct questions 20c, 20d, and 20e.

From the selected attribute values 24, question server 18 generates a question format 26 in which new questions 28 will be expressed. Format 26 defines a relationship between facts from fact database 14 and words in word database 16 used in new questions 28. That is, question format 26 provides a set of words from word database 16 for a given set of facts from fact database 14 used to form a question. For example, one format in which new questions 28 may be expressed would take the form "Which of the following people attended the <event> on <date> at <time>?". Question server 18 determines the facts used in this question (event, date, time) and words surrounding the facts from selected attribute values 24. In some arrangements, question server 18 forms more than one format 26, each such format used for different sets of facts used in forming a question.

From the format 26, question server 18 generates new questions 28, each new question 28 having new values of attributes A, B, and C. For example, question server 18 inserts particular facts from fact database 14 into format 26 to form a new question 28.

It should be understood that the procedure described above functions within a closed-loop system. That is, question server 18 generates new questions 28 from knowledge within a single KBA system 92 (see FIG. 5). Taking data from outside the system (e.g., from outside data sources such as public records) would lead to less effective questions.

Further details of question server 18 will be described below with respect to FIG. 2.

Figure 2:
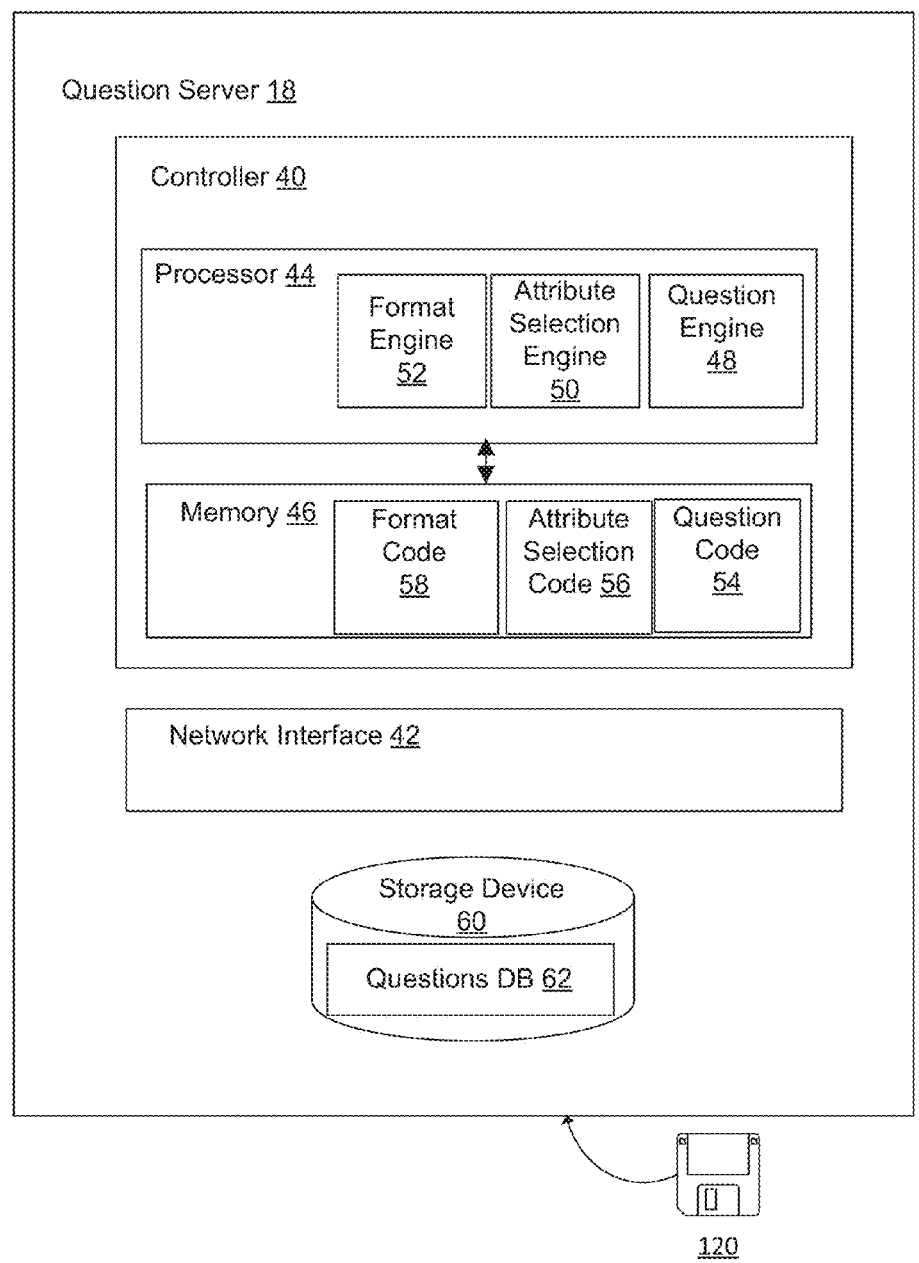
FIG. 2 is a block diagram illustrating an example question server within the electronic environment shown in FIG. 1.

FIG. 2 illustrates question server 18 in further detail. Question server 18 includes controller 40, which in turn includes processor 44 and memory 46, network interface 42, and storage device 60 on which questions database 62 is stored.

Network interface 42 takes the form of an Ethernet card; in some arrangements, network interface 42 takes other forms including a wireless receiver and a token ring card.

Memory 46 is configured to store code which includes question code 54 configured to provide instructions to generate a set of questions 28 from facts in fact database 14 (see FIG. 1). Questions 28, in turn, are stored in questions database 62 on storage device 60. Memory 46 also includes attribute selection code 56, which is configured to provide instructions to determine attribute values based on correct answers to pilot questions. Memory 46 further includes format code 58, which is configured to provide instructions to generate a format from selected attribute values 24. Memory 50 generally takes the form of, e.g., random access memory, flash memory or a non-volatile memory.

Processor 44 takes the form of, but is not limited to, Intel or AMD-based MPUs, and can include a single or multi-cores each running single or multiple threads. Processor 44 is coupled to memory 46 and is configured to execute instructions from question code 54, attribute selection code 50, and format code 58. Processor 48 includes question engine 48 which is configured to execute instructions provided by question code 54, attribute selection engine 50 which is configured to execute instructions provided by attribute selection code 56, and format engine 52 which is configured to execute instructions provided by format code 58.

During operation, question server 18 receives results of answers of prior questions 20 stored in question database 62 over network interface 42. Processor 44 stores the results in question database 62. It should be understood that each entry of question database 62 includes a KBA question 20 and attribute values. In some arrangements, each entry of question database 62 also includes a value of an indication parameter corresponding to the fraction of users who have been successfully authenticated that answered the KBA question of the entry correctly.

Attribute selection engine 50 selects attributes values based on the results of the answers stored in question database 62. In some arrangements, attribute selection engine 50 performs statistical analyses of the attribute values based upon corresponding values of the indication parameter. In some arrangements, attribute selection engine 50 performs a machine learning operation to determine which attribute values correlate with larger values of the indication parameter. Processor 44 stores resulting selected attribute values 24 (see FIG. 1) in memory 46.

Format engine 52 derives a set of formats 26 (see FIG. 1) based on selected attribute values 24 stored in memory 46. Processor 44 stores formats 26 in question database 62.

Question engine 48 generates KBA questions using formats 26. For each user, question engine 48 inserts facts from fact database 14 (see FIG. 1) into templates defined by formats 26 to create KBA questions. In some arrangements, question engine 48 marks particular questions as pilot questions, whose answers are to be used to update formats 26.

A specific example of the technique of generating KBA questions described above is described with respect to FIG. 3.

Figure 3:
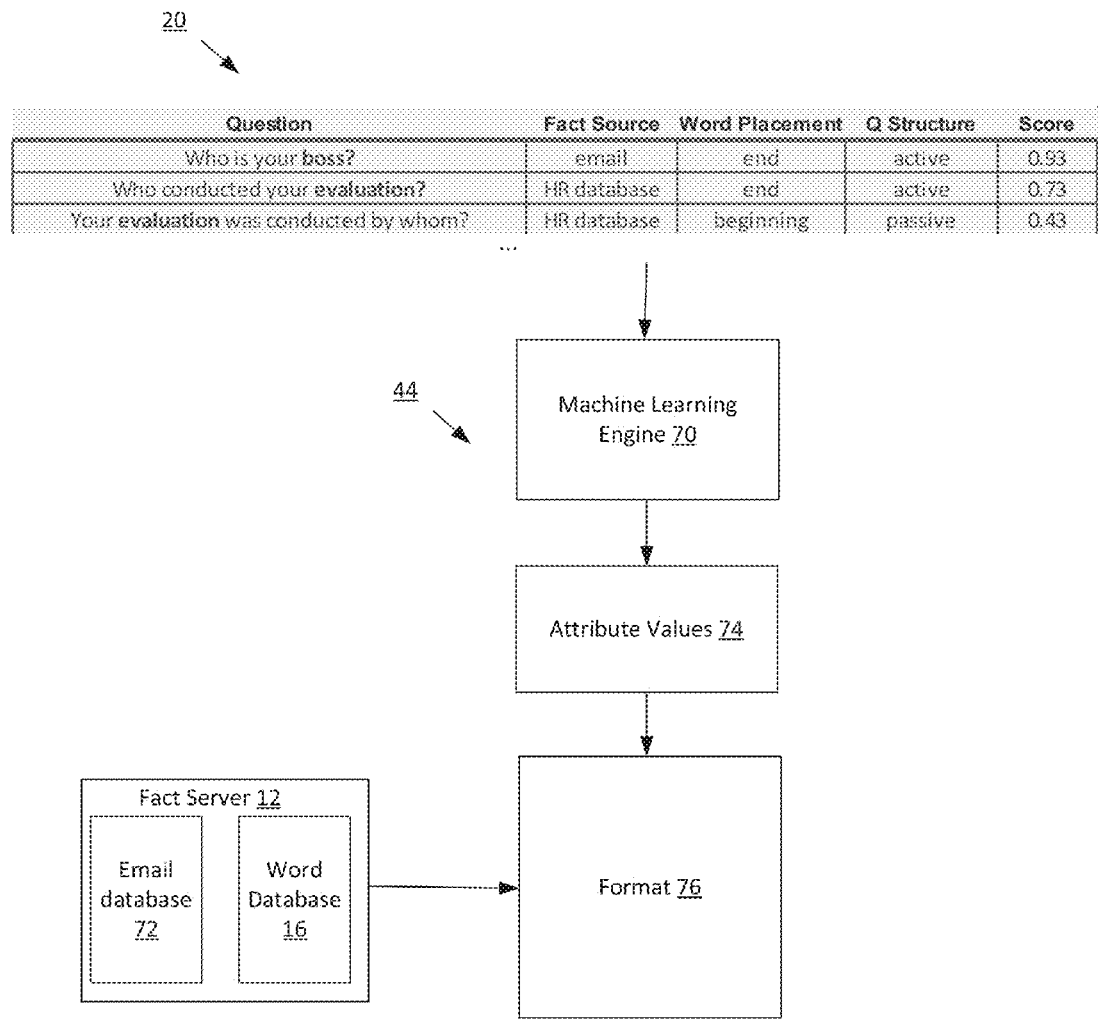
FIG. 3 is a block diagram illustrating an example set of questions from which attributes for new questions are selected by the question server of FIG. 2.

FIG. 3 illustrates an example table 64 of results of providing pilot KBA questions 66 (see FIG. 1) to users 22. Pilot questions 66 include questions such as "Who is your boss?", "Who conducted your evaluation?", and "Your evaluation was conducted by whom?". It should be understood that these questions may all have the same answer, but are framed in different ways. The different ways in which pilot questions 66 are framed are summarized in table 64 through corresponding attribute values. For example, the question "Who is your boss?" has a fact source being an email server, a fact placement at the end of the question, and the question structure being active voice. The question "Who conducted your evaluation?", on the other hand, has a fact source being an HR database, a fact placement at the end of the question, and the question structure being active voice. The question "Your evaluation was conducted by whom?" has a fact source being an HR database, a fact placement at the beginning of the question, and the question structure being passive voice. Table 64 also includes corresponding scores, or values of the indication parameter.

Processor 44 inputs contents of table 64 into a correlation engine 70, which functions as attribute selection engine 50 (see FIG. 2). Correlation engine 70 determines a set of values of the attributes that are best correlated to a high value of the indication parameter. For example, email servers as fact sources, placing facts at the end of a question, and using active voice would correlate with a high value of the indication parameter. Processor 44 places such attribute values in a memory location 74 within memory 46.

As described above, format engine 52 derives one or more formats 76 from attribute values 74. For example, one such format may take the form "Who is your <relationship>?" Another such question may take the form "When did <relation> perform <task>?". The words in angle brackets "< >" represent placeholders for various types of facts to be inserted into the format for creating KBA questions. Question engine 48 fills the placeholders with facts from fact database 14 (see FIG. 1).

It should be understood that many KBA questions are multiple-choice. The choices include one correct answer and several confounders designed to seem plausibly correct to someone with partial knowledge of a user's information. Such KBA questions are discussed in more detail with respect to FIG. 4.

Figure 4:
FIG. 4 is a schematic diagram illustrating an example set of attribute values of a multiple choice question.

FIG. 4 illustrates a table 80 that includes an example multiple-choice question 82. Multiple-choice question 82 includes a set of choices 84, one of which is the correct answer to question 82. Question engine 48 derives this correct choice from fact database 14. In some arrangements, processor 44 assigns attributes and attribute values to the correct choice; from the attribute values, processor 44 may derive a correct choice format based on results of answers given by users 22 (see FIG. 1).

In some further arrangements, processor 44 may also assign attribute values to the confounders of question 82. In this case, however, processor 44 may consider incorrectly answered questions from users who failed to authenticate. Nevertheless, processor 44 would follow a similar procedure as that for the correct choice in deriving possible formats for the confounders.

Figure 5:
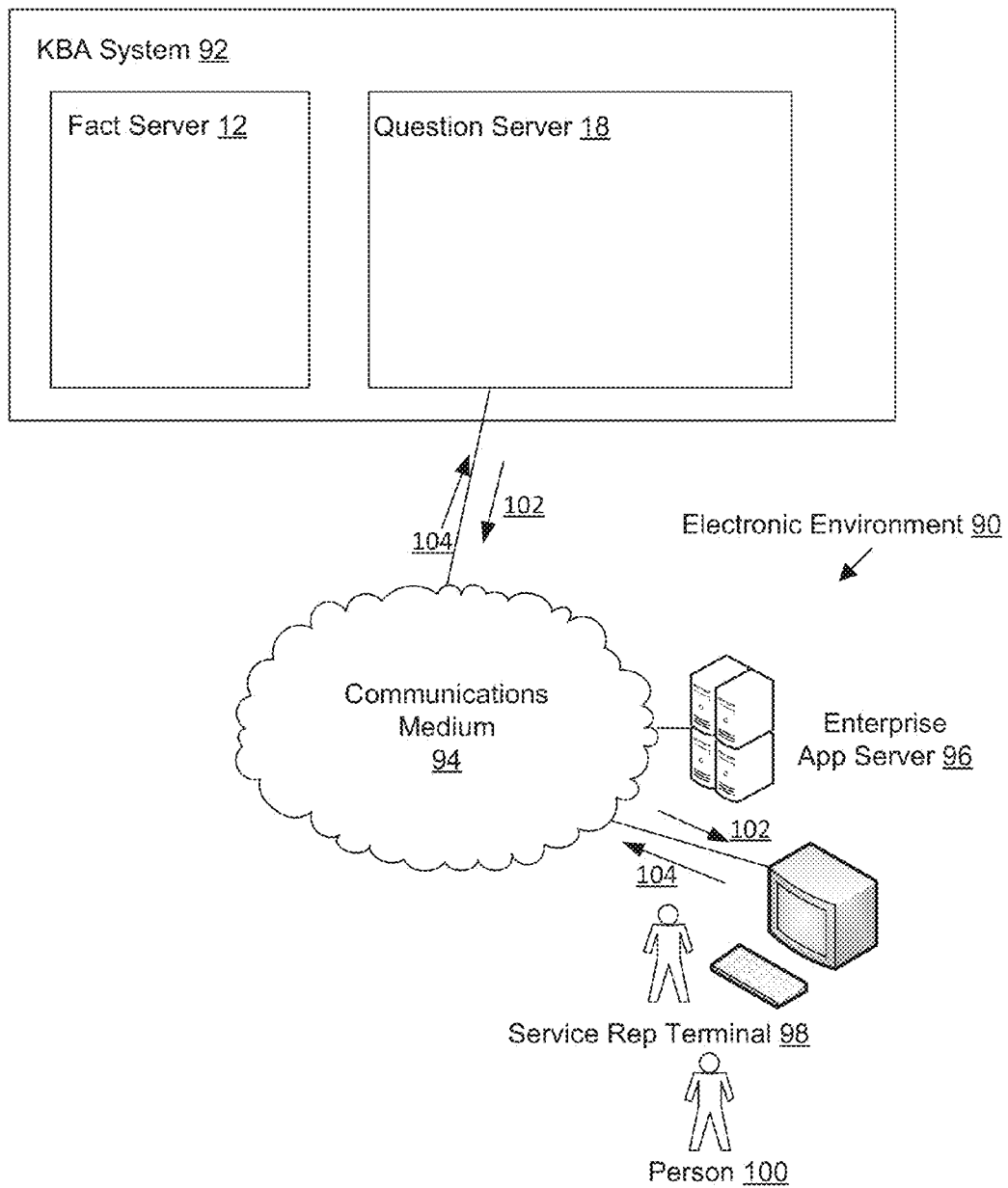
FIG. 5 is a block diagram illustrating another example electronic environment for authenticating a person using questions generated according to the improved technique.

FIG. 5 illustrates another example electronic environment 90 for carrying out the improved technique. Electronic environment 90 includes KBA system 92, which in turn includes fact server 12 and question server 18, communications medium 94, enterprise app server 96, and server representative terminal 98.

Communication medium 94 provides network connections between KBA system 92, enterprise app server 96, and service rep terminal 98. Communications medium 94 may implement a variety of protocols such as TCP/IP, UDP, ATM, Ethernet, Fibre Channel, combinations thereof, and the like. Furthermore, communications media 94 may include various components (e.g., cables, switches/routers, gateways/bridges, NAS/SAN appliances/nodes, interfaces, etc.). Moreover, the communications medium 94 are capable of having a variety of topologies (e.g., queue manager-and-spoke, ring, backbone, multi drop, point to-point, irregular, combinations thereof, and so on).

Enterprise app server 96 provides an application programming interface (API) for providing questions to person 100.

Service rep terminal 98 receives questions from enterprise app server 96 and presents them to person 100, through a service representative. In some arrangements, service rep terminal 98 is a Netview terminal.

During operation, person 100, during an authentication session, submits answers 104 to KBA questions asked via enterprise app server 96 or by a service representative at server representative terminal 98. At least one of the KBA questions is a pilot question who corresponding answer 104 is configured to be analyzed by question server 18. Based on answer 104, question server 18 derives new KBA questions 102 according to a procedure described above. Sometime later, when person 100 requests authentication again, KBA system 92 sends person 100 KBA questions 102 which need to be answered correctly for a successful authentication.

Figure 6:
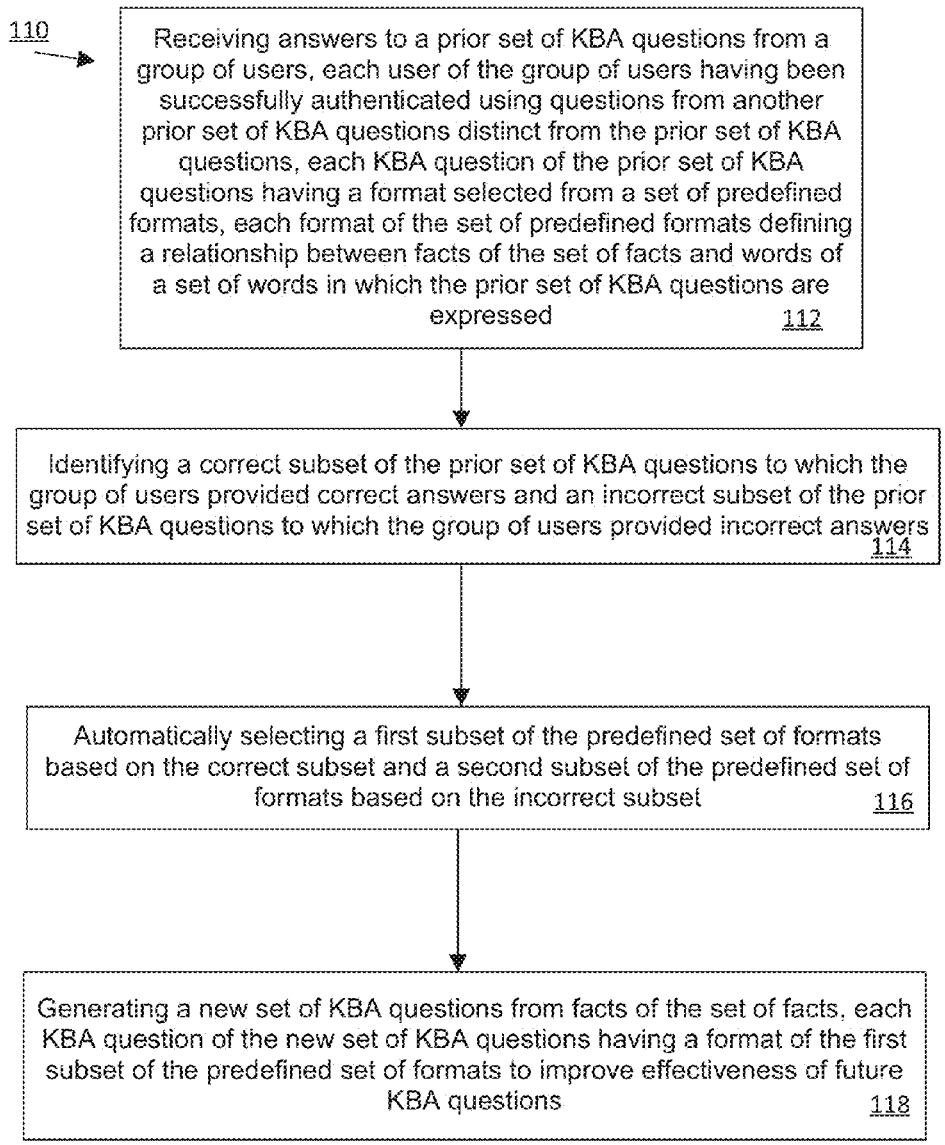
FIG. 6 is a flow chart illustrating a method of carrying out the improved technique within the electronic environment shown in FIG. 1.

FIG. 6 illustrates a method 110 of generating KBA questions from a set of facts. In step 112, answers to a prior set of KBA questions are received from a group of users, each user of the group of users having been successfully authenticated using questions from another prior set of KBA questions distinct from the prior set of KBA questions, each KBA question of the prior set of KBA questions having a format selected from a set of predefined formats, each format of the set of predefined formats defining a relationship between facts of the set of facts and words of a set of words in which the prior set of KBA questions are expressed. In step 114, a correct subset of the prior set of KBA questions to which the group of users provided correct answers and an incorrect subset of the prior set of KBA questions to which the group of users provided incorrect answers are identified. In step 116, a first subset of the predefined set of formats is automatically selected based on the correct subset and a second subset of the predefined set of formats based on the incorrect subset. In step 118, a new set of KBA questions are generated from facts of the set of facts, each KBA question of the new set of KBA questions having a format of the first subset of the predefined set of formats to improve effectiveness of future KBA questions While various embodiments of the invention have been particularly shown and described, it will be understood by those skilled in the art that various changes in form and details may be made therein without departing from the spirit and scope of the invention as defined by the appended claims.

For example, in some arrangements, fact server 12 may obtain data from system logs. In this way, pilot questions can return data on whether KBA questions based on system logs make for effective authentication schemes.

Furthermore, it should be understood that some embodiments are directed to question server 18, which is constructed and arranged to generate KBA questions from a set of facts. Some embodiments are directed to a process of generating KBA questions from a set of facts. Also, some embodiments are directed to a computer program product which enables computer logic to generate KBA questions from a set of facts.

In some arrangements, question server 18 is implemented by a set of processors or other types of control/processing circuitry running software. In such arrangements, the software instructions can be delivered, within question server 18, respectively (see FIG. 2), in the form of a computer program product 120, each computer program product having a computer readable storage medium which stores the instructions in a non-volatile manner. Alternative examples of suitable computer readable storage media include tangible articles of manufacture and apparatus such as CD-ROM, flash memory, disk memory, tape memory, and the like.

What is claimed is:

1. A method of generating knowledge-based authentication (KBA) questions from a set of facts, the method comprising:

receiving, by a processor of a computer, answers to a first prior set of KBA questions from a group of users, each user of the group of users having been successfully authenticated using questions from a second prior set of KBA questions distinct from the first prior set of KBA questions, each KBA question of the first prior set of KBA questions having a format selected from a set of predefined formats, each format of the set of predefined formats defining a relationship between facts of the set of facts and words of a set of words in which the first prior set of KBA questions are expressed;

identifying, by the processor, a correct subset of the first prior set of KBA questions to which the group of users provided correct answers and an incorrect subset of the first prior set of KBA questions to which the group of users provided incorrect answers;

automatically selecting, by the processor, a first subset of the predefined set of formats based on the correct subset and a second subset of the predefined set of formats based on the incorrect subset; and generating, by the processor, a new set of KBA questions from facts of the set of facts, each KBA question of the new set of KBA questions having a format of the first subset of the predefined set of formats to improve effectiveness of future KBA questions.

2. A method as in claim 1, wherein each format of the set of predefined formats is composed of values of a set of communication factors, each communication factor of the set of communication factors representing a particular expressive configuration of the format;

wherein the method further comprises:

prior to receiving the answers to the first prior set of KBA questions, forming the predefined set of formats from the values of the set of communication formats.

3. A method as in claim 2, wherein automatically selecting the first subset and the second subset of the predefined set of formats includes:

identifying particular values of the set of communication factors of formats of KBA questions of the first subset of the first prior set of KBA questions, and
identifying the first subset and the second subset of the predefined set of formats based on the particular values of the set of communication factors.

4. A method as in claim 3,
wherein each KBA question of the first prior set of KBA questions is associated with a value of an indication parameter that indicates how many users of the group of users answered the KBA question correctly;
wherein identifying the correct subset and the incorrect subset of the first prior set of KBA questions includes:
identifying a KBA question of the first prior set of KBA questions as belonging to the correct subset when the value of the indication parameter of the KBA question is greater than a threshold value, and identifying a KBA question of the first prior set of KBA questions as belonging to the incorrect subset when the value of the indication parameter of the KBA question is less than a threshold value.

5. A method as in claim 4,
wherein identifying the particular values of the set of communication factors includes:
for each KBA question of the correct subset, inputting into a correlation model i) the values of the set of communication factors of the formats of the KBA question and ii) the value of the indication parameter of the KBA question; and
obtaining the values of the set of communication factors of the new format from the correlation model.

6. A method as in claim 4,
wherein a certain KBA question of the correct subset of the first prior set of KBA questions is a multiple-choice question having a correct choice, the correct choice being derived from facts of the set of facts;
wherein the method further comprises:
identifying values of the set of communication factors of the format of the certain KBA question; and
generating a correct choice format based on the values of the set of communication factors of the format of the certain KBA question of the first subset, the correct choice format defining a relationship between defining a relationship between the particular facts and words of the set of words in which the correct choice are expressed; and
wherein generating the new set of KBA questions from the particular facts includes:
producing the correct choice of a certain KBA question of the new set of KBA questions using the correct choice format, the certain KBA question of the new set of KBA questions being a multiple-choice question.

7. A method as in claim 6,
wherein the certain KBA question of the correct subset of the first prior set of KBA questions further has a set of confounders, each confounder of the set of confounders being derived from other facts of the set of facts;
wherein the method further comprises:
generating a confounder format based on the values of the set of communication factors of the format of the certain KBA question, the confounder format defining a relationship between facts of the set of facts and words of the set of words in which the confounders are expressed; and
wherein generating the new set of KBA questions from the particular facts further includes:
producing the set of confounders of the certain KBA question of the new set of KBA questions using the confounder format.

8. A method as in claim 3,
wherein a particular communication factor of the set of communication factors is a source of facts from which the particular facts were obtained;
wherein generating the new set of KBA questions from facts of the set of facts includes:
deriving KBA questions of the new set of KBA questions from facts obtained from the source of facts.

9. A method as in claim 3,
wherein a particular communication factor of the set of communication factors is a question structure which defines an order of the words in which the KBA questions are expressed; and
wherein identifying the first subset and the second subset of the predefined set of formats based on the particular values of the set of communication factors includes:
arranging the words in which the KBA questions are expressed according to the value of the particular communication factor of the set of communication factors.

10. A method as in claim 1,
wherein each KBA question of the prior set of KBA questions is derived from the same facts of the set of facts and corresponds to the same correct answer, the first prior set of KBA questions forming different representations of a single query;
wherein identifying the correct subset and the incorrect subset includes:
for each KBA question of the first prior set of KBA questions, assigning the KBA question to the correct subset when the group of users provides the correct answer in response to the KBA question, and assigning the KBA question to the incorrect subset when the group of users does not provide the correct answer in response to the KBA question.

11. A method as in claim 1, wherein the predefined set of formats includes a question format containing a fixed set of words, a subject, and an object, the subject and object being based on the set of facts;
wherein generating the new set of KBA questions from facts of the set of facts includes producing subjects and objects from the facts to be inserted into the question format of the new set of KBA questions.

12. A system constructed and arranged to generate KBA questions from a set of facts, the system comprising:
memory; and
a controller including controlling circuitry coupled to the memory, the controlling circuitry being constructed and arranged to:
receive answers to a first prior set of KBA questions from a group of users, each user of the group of users having been successfully authenticated using questions from a second prior set of KBA questions distinct from the first prior set of KBA questions, each KBA question of the first prior set of KBA questions having a format selected from a set of predefined formats, each format of the set of predefined formats defining a relationship between facts of the set of facts and words of a set of words in which the first prior set of KBA questions are expressed;
identify a correct subset of the first prior set of KBA questions to which the group of users provided correct answers and an incorrect subset of the first prior set of KBA questions to which the group of users provided incorrect answers;

automatically select a first subset of the predefined set of formats based on the correct subset and a second subset of the predefined set of formats based on the incorrect subset; and generate a new set of KBA questions from facts of the set of facts, each KBA question of the new set of KBA questions having a format of the first subset of the predefined set of formats to improve effectiveness of future KBA questions.

13. A system as in claim 12,
wherein each format of the set of predefined formats is composed of values of a set of communication factors, each communication factor of the set of communication factors representing a particular expressive configuration of the format;
wherein the controlling circuitry is further constructed and arranged to:
prior to receiving the answers to the first prior set of KBA questions, forming the predefined set of formats from the values of the set of communication formats.

14. A system as in claim 13,
wherein automatically selecting the first subset and the second subset of the predefined set of formats includes:
identifying particular values of the set of communication factors of formats of KBA questions of the first subset of the first prior set of KBA questions, and
identifying the first subset and the second subset of the predefined set of formats based on the particular values of the set of communication factors.

15. A system as in claim 14,
wherein each KBA question of the first prior set of KBA questions is associated with a value of an indication parameter that indicates how many users of the group of users answered the KBA question correctly;
wherein identifying the correct subset and the incorrect subset of the first prior set of KBA questions includes:
identifying a KBA question of the first prior set of KBA questions as belonging to the correct subset when the value of the indication parameter of the KBA question is greater than a threshold value, and identifying a KBA question of the first prior set of KBA questions as belonging to the incorrect subset when the value of the indication parameter of the KBA question is less than a threshold value.

16. A system as in claim 15,
wherein identifying the particular values of the set of communication factors includes:
for each KBA question of the correct subset, inputting into a correlation model i) the values of the set of communication factors of the formats of the KBA question and ii) the value of the indication parameter of the KBA question; and
obtaining the values of the set of communication factors of the new format from the correlation model.

17. A computer program product having a non-transitory, computer-readable storage medium which stores code to generate KBA questions from a set of facts, the code including instructions to:
receive answers to a first prior set of KBA questions from a group of users, each user of the group of users having been successfully authenticated using questions from a second prior set of KBA questions distinct from the first prior set of KBA questions, each KBA question of the prior set of KBA questions having a format selected from a set of predefined formats, each format of the set of predefined formats defining a relationship between facts of the set of facts and words of a set of words in which the first prior set of KBA questions are expressed;
identify a correct subset of the first prior set of KBA questions to which the group of users provided correct answers and an incorrect subset of the first prior set of KBA questions to which the group of users provided incorrect answers;
automatically select a first subset of the predefined set of formats based on the correct subset and a second subset of the predefined set of formats based on the incorrect subset; and
generate a new set of KBA questions from facts of the set of facts, each KBA question of the new set of KBA questions having a format of the first subset of the predefined set of formats to improve effectiveness of future KBA questions.

18. A computer program product as in claim 17,
wherein each format of the set of predefined formats is composed of values of a set of communication factors, each communication factor of the set of communication factors representing a particular expressive configuration of the format;
wherein the code includes further instructions to:
prior to receiving the answers to the first prior set of KBA questions, forming the predefined set of formats from the values of the set of communication formats.

19. A computer program product as in claim 18,
wherein automatically selecting the first subset and the second subset of the predefined set of formats includes:
identifying particular values of the set of communication factors of formats of KBA questions of the first subset of the first prior set of KBA questions, and
identifying the first subset and the second subset of the predefined set of formats based on the particular values of the set of communication factors.

20. A computer program product as in claim 19,
wherein each KBA question of the first prior set of KBA questions is associated with a value of an indication parameter that indicates how many users of the group of users answered the KBA question correctly;
wherein identifying the correct subset and the incorrect subset of the first prior set of KBA questions includes:
identifying a KBA question of the first prior set of KBA questions as belonging to the correct subset when the value of the indication parameter of the KBA question is greater than a threshold value, and identifying a KBA question of the first prior set of KBA questions as belonging to the incorrect subset when the value of the indication parameter of the KBA question is less than a threshold value.

21. A computer program product as in claim 20,
wherein identifying the particular values of the set of communication factors includes:
for each KBA question of the correct subset, inputting into a correlation model i) the values of the set of communication factors of the formats of the KBA question and ii) the value of the indication parameter of the KBA question; and
obtaining the values of the set of communication factors of the new format from the correlation model.

* * * * *